United States Patent [19]

Roberts

[11] Patent Number: 4,896,063
[45] Date of Patent: Jan. 23, 1990

[54] ELECTROMAGNETIC INDUCTION DEVICES WITH MULTI-FORM WINDING AND REFLECTED MAGNETIZING IMPEDANCE

[75] Inventor: Gary D. Roberts, Riverton, Utah

[73] Assignee: S.P.C. Holding Co., Inc., Salt Lake City, Utah

[21] Appl. No.: 321,234

[22] Filed: Mar. 9, 1989

Related U.S. Application Data

[63] Continuation-in-part of Ser. No. 315,800, Feb. 27, 1989, which is a continuation of Ser. No. 83,137, Aug. 12, 1987, Pat. No. 4,808,868, which is a continuation-in-part of Ser. No. 900,700, Aug. 27, 1986.

[51] Int. Cl.$^4$ .................... H02P 1/44; H02K 11/00
[52] U.S. Cl. .................... 310/68 R; 310/184; 318/794
[58] Field of Search ............ 310/68 R, 149, 184; 318/749, 794, 795, 816, 817

[56] References Cited

U.S. PATENT DOCUMENTS

| | | | |
|---|---|---|---|
| 4,137,488 | 1/1979 | Sibalis | 318/749 |
| 4,446,416 | 5/1984 | Wanlass | 318/817 |
| 4,642,545 | 2/1987 | Lewus | 318/749 |
| 4,808,868 | 2/1989 | Roberts | 310/68 R |

Primary Examiner—Patrick R. Salce
Assistant Examiner—D. L. Rebsch
Attorney, Agent, or Firm—Mason, Fenwick & Lawrence

[57] ABSTRACT

An electromagnetic induction machine having inductively coupled primary, secondary and tertiary branch windings. The exciting current of the primary branch is transformed or reflected, via the inductive coupling, to an electrically separate secondary or tertiary branch. This reflected current in the isolated branch is sustained by connecting a capacitive load impedance to it. Thus, a floating parallel resonant circuit is formed which supplies the needed reactive component in lieu of the primary branch. Different winding techniques are then incorporated in the separate branches to maximize the available winding space and provide improved operating or performance characteristics.

8 Claims, 7 Drawing Sheets

FIG. 1
PRIOR ART

○ PHASE A
✕ PHASE B
○ PHASE C

ELECTROMAGNETIC INDUCTION DEVICES WITH MULTI-FORM WINDING AND REFLECTED MAGNETIZING IMPEDANCE

CROSS-REFERENCES TO RELATED APPLICATIONS

This is a continuation-in-part of U.S. Ser. No. 315,800, filed Feb. 27, 1989, which is a continuation of U.S. Ser. No. 83,137, filed Aug. 12, 1987 now U.S. Pat. No. 4,808,868, which is a continuation-in-part of U.S. Ser. No. 900,700, filed Aug. 27, 1986, all of which are incorporated by reference herein.

FIELD OF THE INVENTION

The present invention relates to electromagnetic induction devices, in general, and to dynamoelectric induction machines utilizing multi-form windings, in particular.

BACKGROUND OF THE INVENTION

Due to rapidly rising power costs, there has been a growing demand for energy-efficient motors. Initially, the major emphasis has been directed toward improved efficiency at the expense of other valuable operating features. This is because present art motor design involves several trade-offs. Usually smaller cooling fans and bearings are used to reduced no-load or friction and windage losses. As a result, motor life is decreased because of impaired ventilation, where the motor runs hotter and this, coupled with the use of smaller bearings, adversely effects both insulation and bearing life. This is of particular importance since bearings and insulation are two major elements that effect motor life and maintenance history. Also, core or iron losses are reduced by increasing the overall length of the stator stack so that the core material can operate below saturation. Generally speaking, core material with a high permeability is used to improve or increase the magnetic flux level. This reduces core loss but, as a trade-off, requires greater magnetizing curents and therefore lowers the power factor of the machine. Since power factor is reduced, additional power factor correction capacitors are needed only adding to the overall cost of installation, operation and maintenance. Another area of improvement in present art energy-efficient motors is that of reducing branch circuit losses. This is accomplished by increasing the amount of copper used, and thereby lowering branch circuit resistance. The trade-off to increased copper fill is increased in-rush or starting current.

Manufacturers of motors and generators thus find that they must enhance or improve their product's efficiency and still provide equipment that satisfies a variety of conditions while incorporating a host of desirable operating features. Many of these features are difficult to achieve in current prior art devices such as induction motors and some features are even contradictory to one another. Examples of this would be providing a machine with both high power factor and high efficiency. In the case of medium- and high-voltage machines, the manufacturer must use more insulation to deal with the higher voltage thus forcing a reduction in the amount of copper or conductive material below that which would ensure optimum efficiency. Countless other problems are encountered in the design of induction machines, such as high in-rush or start-up currents, stray-load losses, skin and proximity losses, harmonic losses and, in the case of iron-core machines, hysteresis and eddy current losses. As both the size and operating voltage of these machines increase, many of the above problems are accentuated. Eliminating or reducing the impact of many of these inherent conditions can be difficult, costly and impractical.

In general, prior art induction machines are provided with single primary branch windings which are sized to safely handle the vector sum of the real and reactive currents required during the operation of such machines. Since these primary windings are all of the same construction and structure, they are incompatible with more than one winding type or technique. Thus, the entire winding structure in prior art machines must be designed to not only withstand the applied voltage stresses, but also to withstand the mechanical stresses caused by start-up and loading. Hence, serious problems are encountered using the same windings, especially in the case of the medium- and high-voltage induction machines, such as polyphase motors.

In medium- and high-voltage machines, the winding coils use unnecessary space for insulation that, given an alternate winding method, could be filled with conductive material such as copper to thus improve the overall operating efficiency of the machine. In one type of induction machine, such as a polyphase induction dynamoelectric device, the coils or winding structures are generally made up of large conductors having square or rectangular cross-sections which help make the coils inflexible or unyielding to movement or mechanical stress. Coils of this nature are commonly referred to as form coils. The large conductors found in form coils exhibit an undesirable characteristic called "skin effect," which is the tendency of alternating currents to flow near the surface of a conductor thus restricting the current to a small part of the total sectional area of the conductor and producing the effect of increasing the resistance.

This skin effect loss is an appreciable loss in large, high-voltage induction machines. When a true resistance value is obtained in an alternating current (AC) circuit (rather than the total impedance of the circuit), it can be seen that the effective resistance of the AC circuit is appreciably higher than the plain ohmic resistance of the same circuit when direct current flows through it. Resistance is therefore a property in an electric circuit that accounts for dissipation of electric energy. Skin effect is one of the ways that energy is dissipated in an alternating current circuit. It is not present in a direct current (dc) circuit.

By viewing the magnetic field as collapsing lines of force around an electric conductor in an AC circuit, it is observed that there are more changes in flux linkage at the center of the conductor than at its surface. This produces greater opposition to the flow of ac at the center of a conductor than at its surface. Therefore, since less current flows in the center of a conductor in the presence of ac, the effective cross-sectional area of the conductor is greatly reduced and thus the effective resistance is greater than the ohmic resistance when measured under dc.

There is thus a need for an improved induction machine in which, among other things, skin effect is reduced, and copper loss is reduced. The present invention is directed toward filling that need.

SUMMARY OF THE INVENTION

The present invention relates to improved induction devices such as single and polyphase transformers, and induction machines such as single and polyphase motors and generators. In a preferred embodiment of the present invention, a polyphase high-voltage induction motor has three primary stator windings adapted to receive three phase input from a power source. The motor also has a rotor including secondary windings. Finally, the motor has three tertiary stator windings, each associated with one of the primary stator windings and forming floating parallel circuitry.

The stator includes three primary phase windings which can be connected to the power source in a Δ or wye configuration and three sets of floating parallel resonant circuits. The floating parallel circuitry consists of the tertiary windings and a group of capacitors. The floating circuit is magnetically coupled to the primary stator windings and rotor windings. The actual phase displacement between the two stator winding sets can differ from that shown, producing everything from a close coupling to a near unity coupling.

An embodiment of the present invention has the primary stator windings arranged in a wye configuration with three-phase input terminals A through C, whereas the three tertiary stator windings are arranged in a floating Δ configuration. Of course, other wye-Δ combinations are contemplated for the primary and tertiary windings.

The primary stator windings in the present invention can be sized in cross-sectional area to be equal to approximately two-thirds the area required by the primary stator windings of prior art induction motors of comparable size. This reduced winding is electrically insulated to withstand the high-voltage potential applied to it and hence the preferred winding method would still be a form coil. But it would be a form coil that uses up much less of the room in an available slot or winding concavity than prior art induction motor designs.

Upon separation of the real and reactive currents, the induced EMF of a tertiary or floating stator winding is substantially lower than that of a high-voltage primary winding. Another advantage of the new tertiary branch is that it is not subject to the mechanical stresses of the primary winding, caused by starting and loading currents. The tertiary branch, therefore, does not require as much insulation. As such, a random winding may be used for the tertiary winding in place of a form coil as used by the primary winding. The preferred method of winding the tertiary branch is to use a random or stranded winding technique. This greatly reduces skin effect losses that prevail in the form coil method of winding and, at the same time, allows for an increase in the cross-sectional area in both the primary and tertiary windings, thus reducing copper or conductor losses.

The present invention allows for a reduction in the skin effect loss by employing as the tertiary floating windings, wire conductors arranged in a stranded condition to form a random wound coil or a "much" winding. Thus, an appreciable amount of the skin effect loss can be reduced by not being restricted to the use of a single unistructural form coil winding.

Since the magnetizing current of an induction machine is an appreciable part of the total current, if transformed from a single branch winding or structure to a separate secondary or tertiary winding branch or structure by use of the subject matter disclosed in co-pending U.S. Pat. Application Ser. No. 315,800, filed Feb. 27, 1989, the winding concavity or receptacle can be maximized or optimized. By using separate winding methods or techniques in the separated branch structures, higher efficiencies are attained. In a preferred embodiment of the present invention, the primary or energized branch winding operates at a medium- or high-voltage potential. In this situation, the floating resonant tertiary winding operates at a low-voltage potential or impedance. This frees-up valuable space in the winding slot normally filled with insulation and allows additional copper or conductive material to be added to both primary and tertiary stator winding branches. Thus, ohmic loss is reduced, resulting in higher net efficiency gains.

In the above example, the voltage or impedance of the secondary rotor winding is the turns ratio of the primary stator windings to the secondary rotor turns. Similarly, the voltage or impedance of the tertiary stator winding is simply the ratio of the primary to tertiary turns.

If floating branch windings produce a voltage higher than the source, a step-up transformer is created. Similarly, a step-down transformer would be one in which the secondary or tertiary voltage is less than the primary branch winding. Thus, a means is provided for transforming or reflecting the magnetizing reactance to a secondary or tertiary member or branch at any desired voltage with minimum loss when the capacitance load impedance is connected to the secondary or tertiary branch. With the capacitive load attached, the electromotive force (EMF) induced into the secondary or tertiary branch by the primary branch flux will cause current to flow in the secondary or tertiary branched and forms what is known as a parallel tank circuit. The current in this tank circuit provides the necessary excitation or magnetizing current needed by the inductive circuit or device.

Since the capacitive load impedance is reduced as the frequency of the current increases in the circuit, according to Lenz's law, this will tend to reduce or cancel the amplitude of any higher order harmonic flux components. Since all inductive machines contain harmonic flux, the operating efficiency will be increased by this harmonic flux cancellation.

Thus, it should be apparent that by transforming or separating the real and reactive current in an inductive device and by lowering the impedance of the reactive resonant floating branch two separate winding methods can be used which will substantially reduce the losses in medium- and high-voltage induction machines. This is accomplished through increased copper fill, reduced harmonic currents, reduced skin losses and hence improvement in the effective cross-sectional area of the conductors. Also, the machine will exhibit reduced leakage reactance, reduced stray load and reduced proximity losses. These changes will increase the efficiency, improve the power factor of the machine and, at the same time, lower the cost to wind or manufacture the machine, since the random winding, which is about one-third of the total winding area, is less costly, uses less insulation and takes less time to wind than a form coil.

It is thus a primary object of the present invention to provide an improved electromagnetic induction machine or device.

It is another object of the present invention to produce an induction machine with an improved floating parallel resonant circuit that can be easily installed or incorporated within the machine's winding slots.

It is an additional object of the present invention to improve an induction machine capable of separating the real and reactive current components into two separate winding structures.

It is a further object of the present invention to improve the power factor of an induction machine by use of a resonant floating winding wound as a random coil.

The subject matter, together with further objects and advantages thereof, may best be understood by reference to the following description taken in conjunction with the accompanying drawings.

BRIEF DESCRIPTION OF THE DRAWINGS

FIG. 2b is an electrical representation of the polyphase induction motor of FIG. 2a.

DETAILED DESCRIPTION OF THE PREFERRED EMBODIMENTS

In describing the preferred embodiments of the subject invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

In describing the teachings of the present invention, it should be appreciated that the teachings may be applied to several induction devices such as single and polyphase transformers. However, the teachings find particular applicability to induction machines.

An induction motor or machine is basically an electric transformer whose magnetic circuit is separated by an air gap into two relative movable portions, one carrying the primary and the other the secondary winding. ac supplied to the primary winding from an electric power system induces an opposing current in the secondary winding, when the latter is short-circuited or closed through an external impedance. Relative motion between the primary and secondary structures is produced by the electromagnetic forces corresponding to the power thus transferred across the air gap by induction. The essential feature which distinguishes the induction machine from other types of electric motors is that the secondary currents are created solely by induction, as in a transformer, instead of being supplied by a dc exciter or other external power source, as in synchronous and dc machines.

Figure 1:
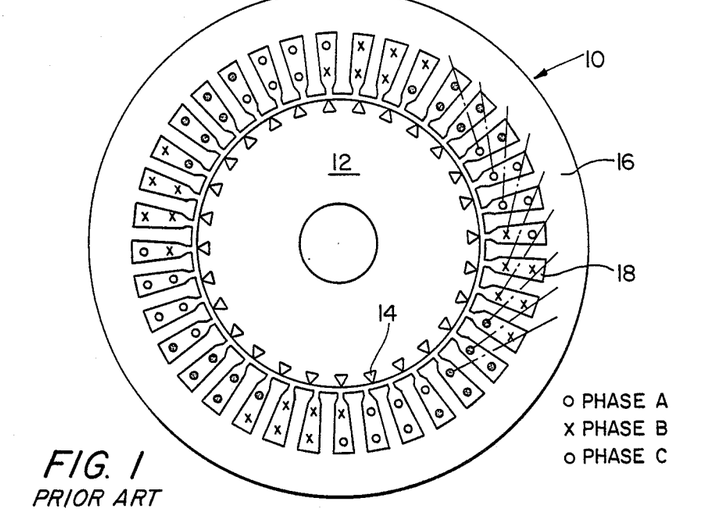
FIG. 1 is a schematic diagram of a prior art three-phase, dynamoelectric induction machine.

With reference to FIG. 1, the customary structure of an induction motor 10 consists of a cylindrical rotor 12 carrying the secondary winding in slots 14 on its outer periphery and an encircling annular core 16 of laminated steel carrying the primary winding in slots 18 on its inner periphery. The primary windings is commonly arranged for three-phase power supply, with three sets of exactly similar multipolar coil groups A, B and C spaced one-third of a pole pitch apart. The superposition of the three stationary, but alternating, magnetic fields produced by the three-phase windings produces a sinusoidally distributed magnetic field revolving in synchronism with the power supply frequency. The direction of rotation is fixed by the time sequence of the currents in successive phase belts and so may be reversed by reversing the connections of one phase of a two- or three-phase motor.

FIG. 1 shows the cross-section of a typical polyphase induction motor 10 having, in this case, a three-phase four-pole primary winding with 36 stator and 28 rotor slots. The primary winding is composed of 36 identical coils, each spanning eight teeth, one less than the nine teeth in one pole pitch. The winding is therefore said to have 8/9 pitch. As there are three primary slots per pole per phase, phase A comprises four equally spaced "phase belts," each consisting of three consecutive coils connected in series. Owing to the short pitch, the top and bottom coil sides of each phase overlap the next phase on either side. The rotor, or secondary, winding consists of 28 identical copper or cast-aluminum bars solidly connected to conducting end rings on each end, thus forming a "squirrel cage" structure. Both rotor and stator cores are typically built of silicon-steel laminations.

Figure 2A:
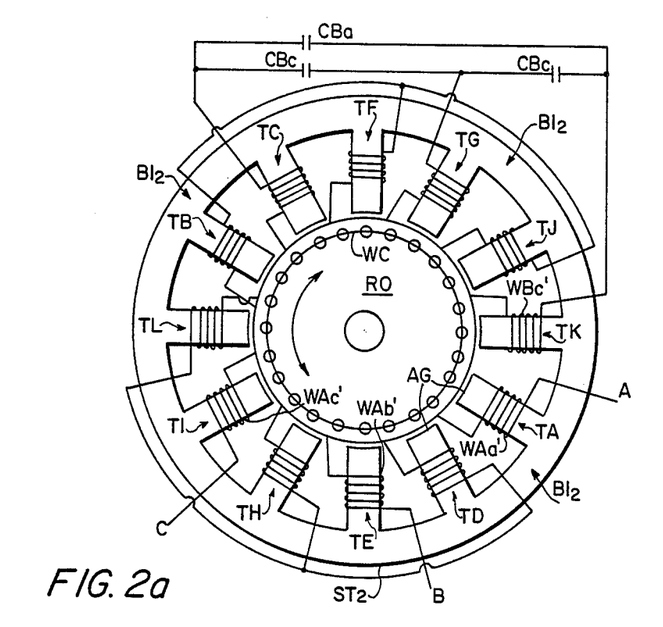
FIG. 2a is a diagrammatical representation of a polyphase induction motor with regulated magnetic symmetry with a parallel floating quasi-resonant circuit. The primary stator windings are connected in a wye configuration to a power source, with the parallel floating windings connected in a wye configuration and the capacitors in the floating circuit connected in a Δ configuration.

FIG. 2a is a diagrammatical representation of a parallel resonant or parallel floating polyphase, ac induction motor having a squirrel cage rotor design. The motor includes a sheet-steel laminated stator $ST_2$ and a rotor RO of like material. For simplification, the stator is shown as having 12 poles or teeth TA, TB, TC, etc., through and including TL, protruding from a return magnetic path or back iron $BI_2$; the actual number of teeth being dependent upon physical size, horsepower and rotational speed for the motor. The physical dimensions of the motor and its integral parts are graphically represented herein. The stator includes three primary phase windings which can be connected to the source of a $\Delta$ or wye configuration and three sets of floating parallel resonant circuits, one set per input phase. The three primary phase windings $WA_x$, where $x = a$, b or c, are connected to input terminals A, B and C in a wye configuration. The rotor RO includes secondary windings $W_c$.

Figure 2B:
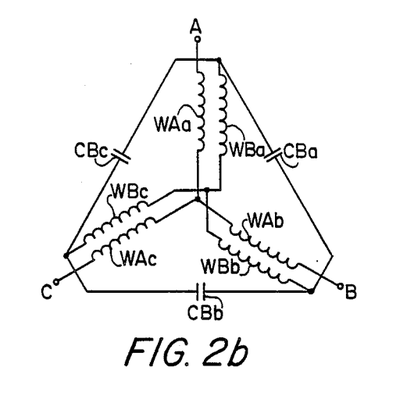
Figure 4:
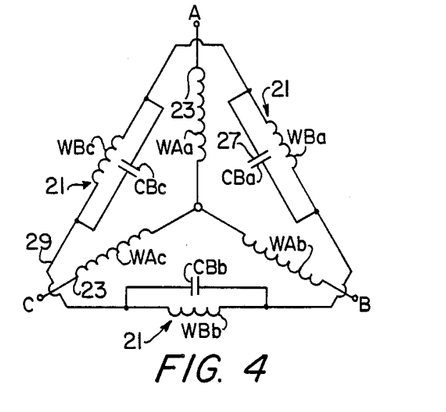
FIG. 4 is an electrical diagram of a polyphase, parallel floating resonant induction motor wherein the primary stator windings are in a wye configuration with respect to the inputs and the parallel floating stator windings and capacitors are in a Δ configuration.

Three tertiary stator windings $WB_x$, where $x = a$, b or c, are part of the floating parallel resonant circuits and are connected in FIGS. 2a and 2b in a wye configuration and in parallel with three capacitors $CB_x$, where $x = a$, b or c, that are connected in a $\Delta$ configuration with respect to each other. In this circuit, capacitor $CB_b$ is parallel to stator windings $WB_b$ and $WB_c$; however, as shown in FIG. 4, the parallel floating capacitor $CB_x$ need only be parallel to one secondary stator winding to form the floating parallel resonant circuit.

The floating parallel circuitry consists of tertiary windings $WB_a$, $WB_b$ and $WB_c$ and capacitors $CB_a$, $CB_b$ and $CB_c$. The tertiary stator windings are wound on teeth TC, TD, TG, TH, TK and TL, respectively. The primary stator phase windings $WA_a$, $WA_b$ and $WA_c$ are wound on teeth TA, TB, TE, TF, TI and TJ, respectively. The tertiary windings are circumferentially interleaved between the primary windings, e.g., $WB_a$, is between $WA_a$ and $WA_b$. The floating circuit is magnetically coupled to the primary phase windings and rotor RO. The actual phase displacement between the two stator winding sets can differ from that shown, producing everything from a close coupling to a near unity coupling. These variances effect desirable changes in motor operating characteristics and therefore the invention is not limited to the embodiment shown in FIG. 2a.

The following is a brief description of the operating principals of the motor shown in FIG. 2a. When a polyphase ac potential is applied to input terminals A, B and C, the primary stator windings, $WA_a$, $WA_b$ and $WA_c$ produce a rotating magnetic flux wave since they are connected to the source in the same way as the windings of a standard motor design. As this magnetic flux wave rotates in the stator's magnetic material the flux cuts the floating parallel windings $WB_a$, $WB_b$ and $WB_c$ together with secondary winding WC in rotor RO. This generates a potential in the winding of the floating circuit and causes a current to flow in them setting up a magnetic field in their associated teeth, their respective air gaps, the rotor magnetic material RO, and the return magnetic material or back iron $BI_2$. The energy stored in capacitors $CB_a$, $CB_b$ and $CB_c$ is discharged as current flows from them into their respective windings.

The preferred winding method would be one in which the primary and floating circuits use different winding connections or one in which the dominant or third or fifth harmonics would be cancelled. Examples of this would be when the primary windings are connected in a wye (Star) configuration and the floating windings or circuits are connected in a $\Delta$ configuration with respect to the primary. Another preferred method would be the reverse order of this connection. Therefore, the parallel floating circuit would not only provide the necessary magnetizing current needed by the induction machine, but the energy stored in the capacitor would be the vector sum of two voltage phases and therefore aid in maintaining an energy balance in the motor during an unbalanced input voltage or condition. Since it is floating or independent from the energy source and magnetically coupled to both primary and rotor circuits, the floating circuit provides a circuit that can adjust to both voltage and load changes and thus regulate the energy transfer between primary and rotor. This provides an intermediate exchange or transfer of energy between winding elements. The preferred winding arrangement would be for the primary and floating stator windings to be wound together in a bifiler arrangement creating a most efficient topology. Since any unused energy or energy converted from mechanical to electrical can be stored in the capacitive and reactive elements of the motor along with the required magnetizing current, the source need only supply the energy needed to provide the necessary mechanical torque and, of course, replace any expended energy. The motor, therefore, runs at or near unity power factor throughout its entire load range.

If the bifiler arrangement is used, it should be understood that the voltage potential of the floating circuit or turns ratio between primary and floating windings $WA_x$ and $WB_x$ must be kept at or near a low-voltage potential (0 to approximately 600 volts) to minimize insulation stress or the need to increase insulation requirements of winding $WB_x$. However, the turns ratio or voltage of winding $WB_x$ should be maintained high enough to economize on the required capacitive element to maintain a resonant condition. This bifiler arrangement provides the best coupling or winding arrangement. However, if not used, the floating winding $WB_x$ needs to be placed at or near the bottom of the slot since it is responsible for the magnetizing of the machine. The power or energized winding $WA_x$ should be placed near the top of the slot to minimize leakage reactance and increase the coupling between primary winding $WA_x$ and rotor RO.

The symmetry and shape of the magnetic flux wave in the air gap or that cutting the winding WC in the rotor RO is an important characteristic in the present invention. This symmetry or physiomagnetic regulation created by intermediate exchange of energy between winding elements results in a higher net magnetic coupling of rotor and stator elements along with the cancellation or reduction in the harmonic content of the air gap flux wave due to the capacitive impedance. These improvements, as compared to present art techniques, result in improved efficiency.

FIG. 4 shows an embodiment of the present invention in which the primary windings $WA_x$ are arranged in a wye configuration with the three-phase input terminals A through C, whereas the three tertiary windings $WB_x$ are arranged in a floating Δ configuration.

Figure 3A:
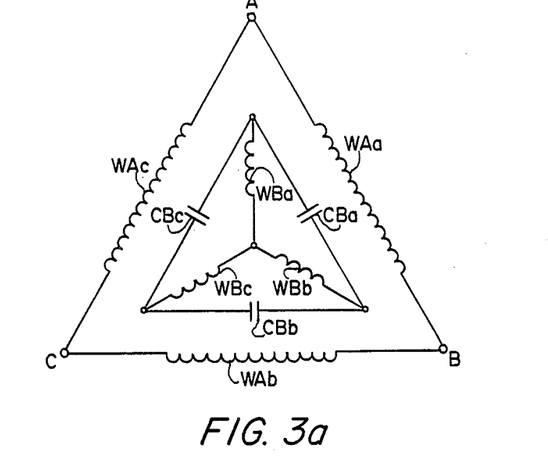
FIG. 3a is an electrical diagram of a polyphase, parallel floating resonant induction motor wherein the primary stator windings are in a Δ configuration with respect to the inputs, the parallel floating stator windings are in a wye configuration and the capacitors are in a Δ configuration.
Figure 3B:
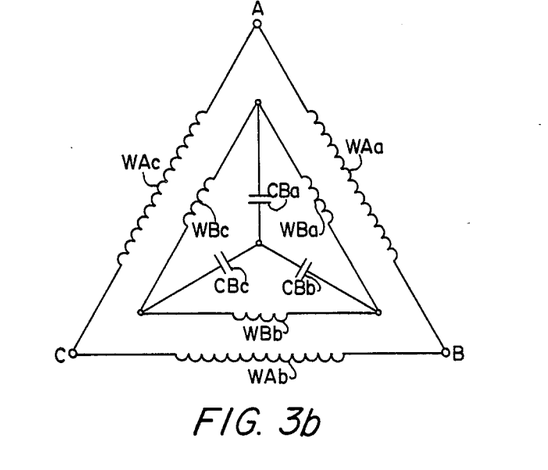
FIG. 3b is an electrical diagram of a polyphase parallel floating resonant induction motor wherein the primary stator windings are in a Δ configuration with respect to the inputs, the parallel floating stator windings are in a Δ configuration and the capacitors are in a wye configuration.

The embodiment in FIG. 4 is a schematic diagram of a preferred embodiment of a three-phase motor illustrating the present invention. Other suitable embodiments are shown in FIGS. 2b, 3a and 3b. A similar construction could also be applied to a three-phase transformer. Although mention will be made of several types of induction devices throughout the course of this disclosure, for convenience the discussion will be limited to the description of the present invention as it relates to a three-phase high-voltage motor. When the scope of this invention is detailed, as it relates to such a motor, those skilled in the art should readily understand the relevancy it has to other poly- and single-phase induction machines and devices. As used herein, a low-voltage motor is one operating at less than 600 volts AC, whereas a high-voltage motor is one operating at greater than 1500 volts ac. A medium-voltage motor operates between 600 volts ac and 1500 volts ac.

Figure 5A:
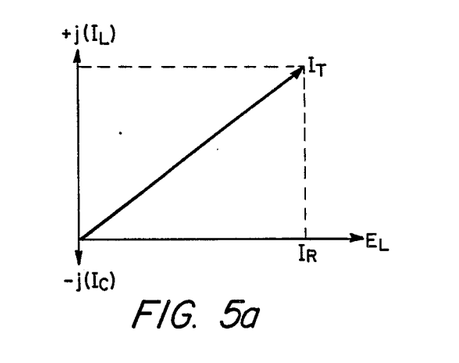
FIG. 5a is a phasor diagram that vectorially illustrates the conditions generally found in the primary winding of a prior art induction machine.
Figure 5B:
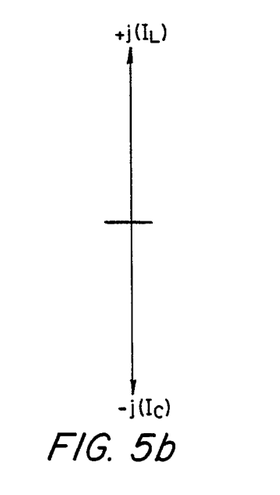
FIG. 5b is a phasor diagram vectorially illustrating the conditions found in the floating parallel resonant circuit of the present invention.
Figure 5C:
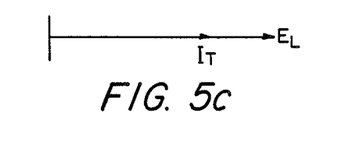
FIG. 5c is a phasor diagram vectorially illustrating the new condition found in the primary winding of the present invention after the reactive current component is reflected to the floating LC resonant branch or circuit.
Figure 11:
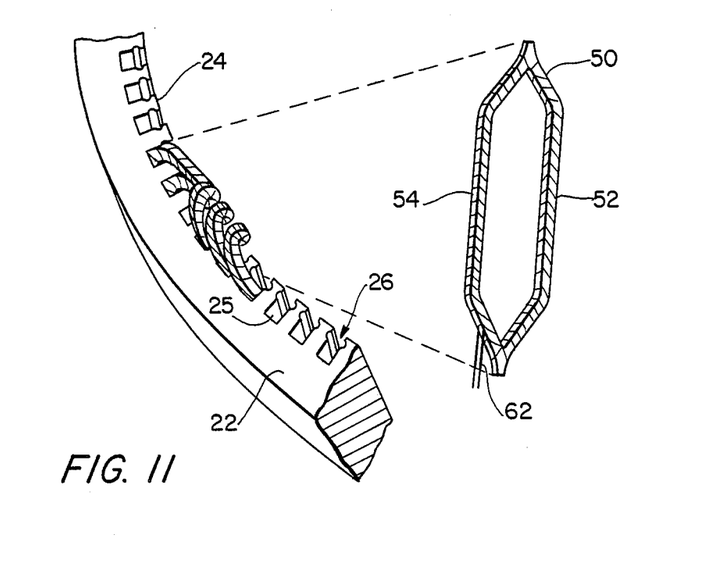
FIG. 11 is a representation of a present art form coil for an electric motor of the double-layer lap-type.

FIGS. 5a through 5c illustrate several phasor diagrams to explain various current and voltage relationships found in induction motors. The phasor diagram of FIG. 5a illustrates the vectorial relationship of the voltage and current found in the primary winding of a prior art induction machine. $E_L$ represents the applied EMF, $I_R$ is the resulting current through the resistance of the winding, $+j(I_L)$ is the inductive reactance of the winding, $-j(I_C)$ is the capacitive reactance of the winding, $I_X$ is the net reactance of the circuit, and $I_T$ is the vector sum of the real and reactive currents which flow through the primary winding. It can be seen by this diagram that the resulting current $I_T$ is not in phase with the applied voltage and therefore the power factor is less than unity (1.0). Since this winding conducts both the real and the reactive currents, the only type of winding that can be incorporated is a single or unistructural winding. In the case of high-voltage machines for applications such as an electric motor, the most desirable winding is a form winding of the type shown in FIG. 11.

If one of the primary windings $WA_x$ were connected to a source of alternating current and if a floating tertiary winding $WB_x$ were then placed in proximity to this energized winding so as to produce a mutual flux coupling between it and the tertiary winding, an EMF would be induced in the turns of the tertiary winding. Now, if the tertiary winding were connected in parallel fashion to a capacitor $CB_x$ forming an LC resonant circuit, the following conditions would prevail. The induced EMF in the tertiary winding $WB_x$ would cause a current to flow so as to charge the parallel connected capacitor $CB_x$. The charge on the capacitor would be equal to, but opposite in polarity, to that of the induced EMF. When fully charged, the capacitor would release its energy by producing a counter flow of current through the tertiary winding and a magnetic field of reverse polarity would be established. As the capacitor reaches its discharged state, the magnetic field would then, in turn, release its energy as current begins to flow through the tertiary winding in the reverse direction. Once again, the capacitor would be charged, but this time the charge would be of the opposite polarity and the cycle would be complete.

Thus, a floating parallel resonant circuit 21 (FIG. 4) is formed, in which this cycle would repeat itself over and over at the rate or frequency of the applied EMF to the primary winding. This creates a near-perfect condition for producing the magnetic requirements of an induction device and also a near-perfect condition for an electrical distribution system because of the near unity (1.0) power factor.

FIG. 5b represents the tertiary winding $WB_x$ as having a positive reactive current in the magnitude on the order of $+j(I_L)$. This positive reactance is neutralized or balanced by the addition of a negative but equal current component, $-j(I_C)$ produced by the parallel capacitor $CB_x$. Thus, FIG. 5b illustrates vectorially the condition necessary to produce a floating parallel resonant circuit and how the magnetizing current $+j(I_L)$ of the primary winding of FIG. 4 is transformed or reflected to a tertiary branch winding 29 or circuit when a parallel capacitor 27 is connected to it. It should be recognized that the induced EMF of the tertiary winding would be proportional to the turns ratio between primary and tertiary windings and their net mutual reactance or flux coupling.

FIG. 5c is a phasor diagram vectorially illustrating the new condition found in the primary winding 23 of the present invention, after the reactive current component is reflected to the floating LC resonant branch or circuit 21. Notice that the new primary circuit contains very little, if any, reactive current. Hence, the induction machine operates at or near (1.0) unity power factor since the current in this new primary branch consists of only the real or $I_T$ current used by the induction machine to do its work. As such, this new branch winding can be sized in cross-sectional area to be equal to approximately two-thirds the area required by the prior art machine illustrated vectorially in FIG. 5a. This reduced winding still needs to be electrically insulated to withstand the high-voltage potential applied to it and hence the preferred winding would also be that shown in FIG. 11. But would use up much less of the total or available slot or winding concavity versus that used by the primary winding of prior art induction motor designs.

Figures 12A, 12B, 13A, 13B:
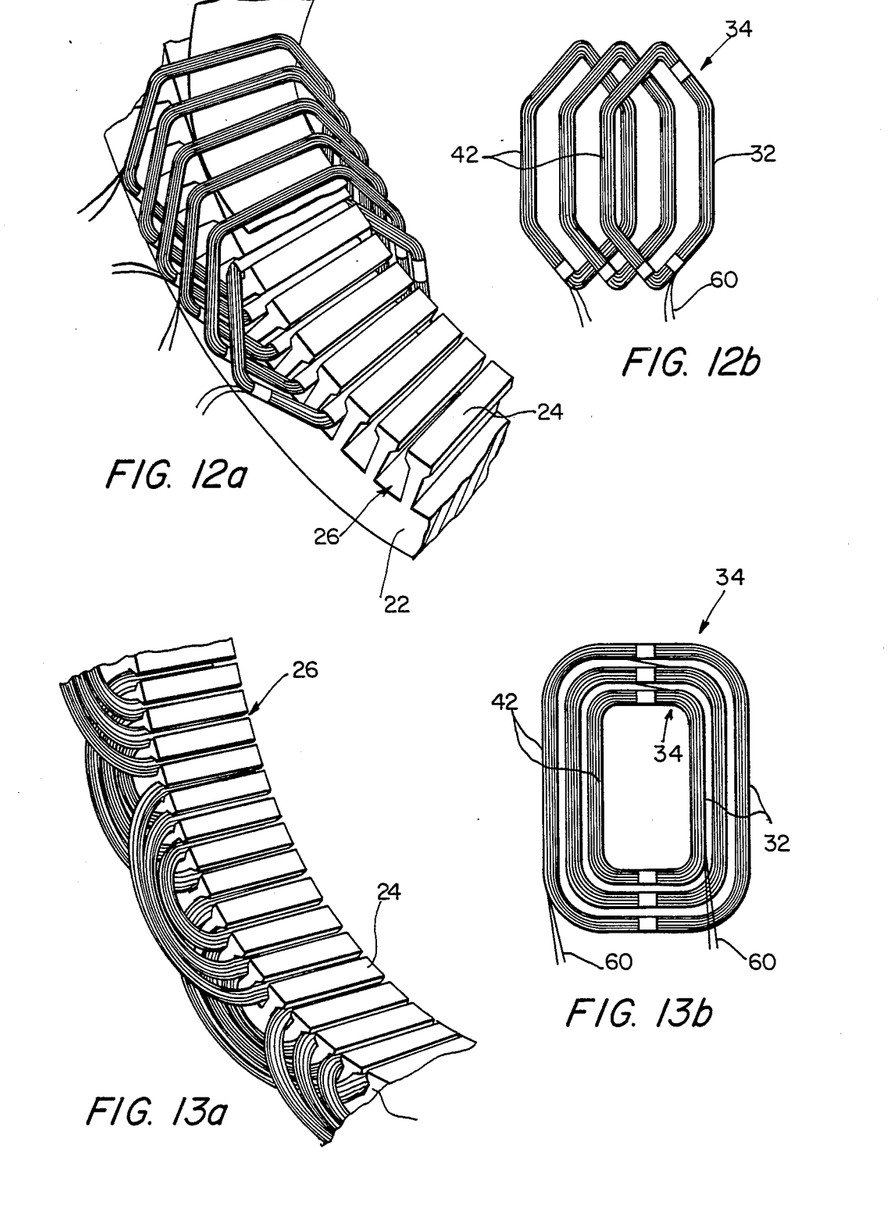
FIGS. 12a and 12b are graphic representations of a present art random wound coil mounted in an electric motor of the double-layer lap-type.
FIGS. 13a and 13b are graphic representations of a present art random would coil mounted in an electric motor of the concentric-type.

Upon separation of the real and reactive currents, the induced EMF of the tertiary or floating branch 21 can be substantially lower than that of the high-voltage primary winding 23. Another advantage of the new tertiary branch is that it is not subject to the mechanical stresses of the primary winding, caused by starting and loading currents. The tertiary branch, therefore, does not require as much insulation. As such, a random winding is used for the tertiary winding $WB_x$ in place of a form coil as used by the primary winding $WA_x$. The preferred method of winding the tertiary branch would be to use a random or stranded winding technique as shown in FIG. 12b or 13b. This greatly reduces skin effect losses that prevail in the form coil method of winding, and at the same time, allows for an increase in the cross-sectional area in both the primary and tertiary windings, thus reducing copper or conductor losses.

Another loss that is greatly reduced in a motor by the separation of the real and reactive currents is the loss commonly called "end bell loss" or loss that occurs due to the proximity of the winding end turns. This loss is minimized in the present invention since the phase currents have been reduced in magnitude and are now out of phase with respect to each other. This loss is appreciable in large machines and especially in high-voltage machines. Thus, the present invention provides a method of reducing these major losses, and thereby increasing the operational efficiency of these machines.

Figure 6:
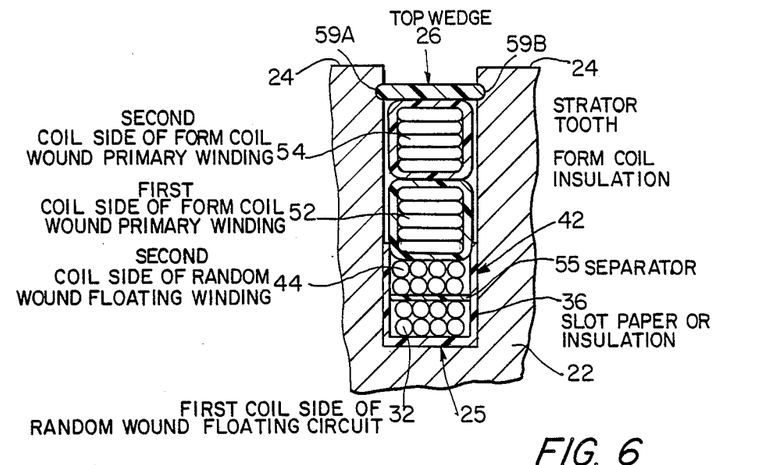
FIG. 6 is a cross-sectional view of a single stator slot for a high-voltage three-phase motor according to the present invention.
Figure 7:
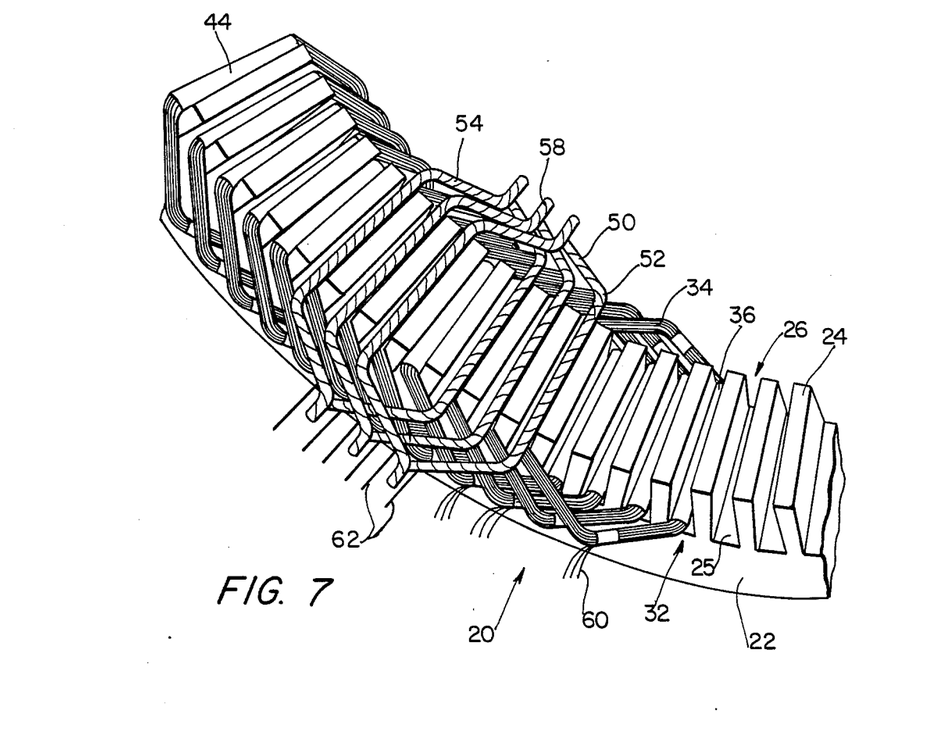
FIG. 7 is a continuing segmental drawing of a stator section for a high-voltage three-phase motor according to the present invention.
Figure 8:
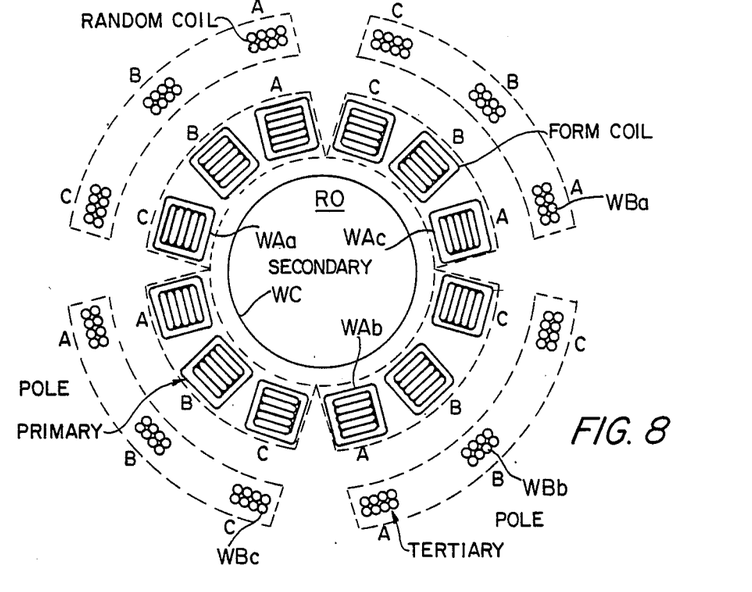
FIG. 8 is a schematic illustration of the preferred physical relationship of the primary windings to the secondary and tertiary windings of a high-voltage three-phase motor incorporating the teachings of the present invention.

FIGS. 6, 7 and 8 schematically illustrate the application of the teachings of the present invention to a high-voltage induction machine.

FIG. 7 shows a portion of a stator 20 composed of a curved stator core 22 on which are defined a plurality of stator teeth 24 that delineate stator slots 26.

In the embodiment of FIG. 7, the first coil side 32 of a randomly wound coil 34 is placed in a slot 26 so that it rests on the floor 25 of the slot. The wires in the coil are insulated from the slot through a conventional insulation wrapper 36. The random coil 34 spans several slots and is received in a slot located four slot distances away from the slot receiving the first coil side of the random coil. In this configuration, as shown in FIG. 6, the second coil side 42 of random coil 34 rests on the first coil side of a different random coil with a conventional insulation separator 55 interposed therebetween. As in the case of the first coil side, the second coil side 42 is also covered with a conventional insulation sleeve 44.

Next, a primary stator winding 50 is introduced into the slots. In the preferred embodiment, the primary winding is a form coil having a first coil side 52 and a second coil side 54. The form coil would primary winding 50 is wound from a plurality of continuous copper strips 56, having a rectangular or square form. These strips are pressed together to form a unitary structure of approximate square cross-section. The pre-formed strips are then completely covered with an insulating tape 58, such as fiberglass cloth porous to epoxy. During manufacture the fiberglass cloth is covered with an epoxy thus rendering the form coil more rigid and exhibiting an increased insulation factor. As can be seen in FIG. 7, the random coils contain wire leads 60 and the form coils contain leads 62 which are subsequently secured together in an operating configuration such as that shown in FIG. 4 in conjunction with external capacitors.

As shown in FIG. 6, the first coil side 42 of primary winding 50 sits atop the second coil side 44 of random tertiary coil 34. The primary windings span an equal number of slots to those of the tertiary windings. As such, at some point in the construction, the second coil side of a primary winding 50 will rest atop the first coil side of a related primary winding. The winding structure is completed by securing a conventional top wedge 57 into mounting V-grooves 59a and 59b in slot 24 to mechanically secure the windings. The top wedge is made of an insulating material.

With reference to FIG. 6, it should be noted that a random wound tertiary coil or mush winding 34 of the type shown in FIG. 12b is used in the present invention and placed near the bottom 25 of the slot 36 to improve the magnetizing capability of the slot. The high-voltage form would coil or primary winding 50 of the present invention is a form coil of the type shown in FIG. 11 and is located near the top of the slot 36 to reduce leakage reactance and stray losses.

FIG. 8 illustrates the preferred physical relationship of primary windings $WA_x$ to the secondary or rotor winding WC and the tertiary windings $WB_x$ of a high-voltage three-phase motor of the present invention. It should be noted in this figure that the rotor or secondary winding WC is located in the center. However, if the motor were an inside-out type or design, the reverse order would be used. Notice also that FIG. 8 designates the poles of the motor by using a dashed or dotted line. It is important when connecting the coils of the form coil primary and tertiary random or stranded windings, that they follow the pattern indicated in this illustration to prevent internal circulating currents that would reduce the efficiency of the machine.

Figure 9:
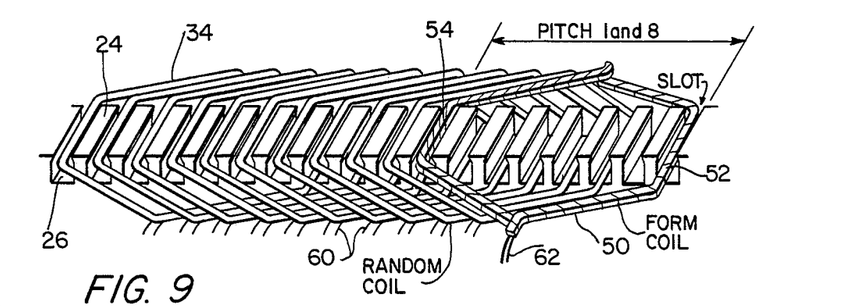
FIG. 9 is a diagrammatical drawing of the stator section of a three-phase motor which displays the winding distribution of the present invention as it would relate to a lap-wound induction machine.

FIG. 9 shows the distribution of the primary and tertiary windings in another preferred embodiment of the invention. The drawing shows a pitch of 1 to 8, but it should be understood that this will vary with the number of slots and poles. The important thing is that both primary and tertiary windings are wound with the same pitch or span.

Figure 10:
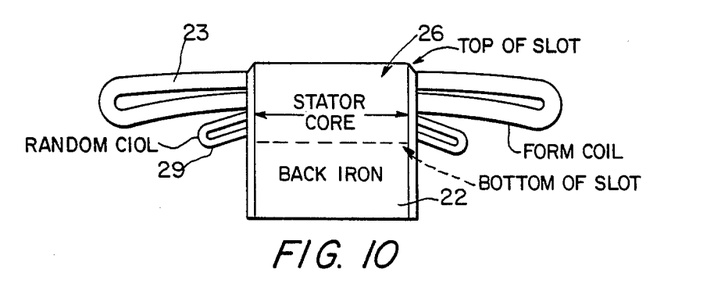
FIG. 10 is a pictorial diagram showing a side view of a portion of the stator and coils of the high-voltage motor of FIG. 4.

Another important aspect of the present invention as it relates to high-voltage motors is shown in FIG. 10. In particular, FIG. 10 shows the windings of the tertiary branch 29 as beng shorter than the windings of the primary branch 23. This is a feature that can only be achieved with the present invention and allows for optimization of resistance of the tertiary winding and reduces copper or conductor loss. Thus, the efficiency of the machine can be improved in many ways when compared to the singe or unistructural winding technique used in prior art induction machines.

Reference should now be made to Table 1 which shows the voltage and current conditions, along with the winding data found in a prior art 400 HP high-voltage induction motor. The Table also shows the same comparisons after the motor had been wound according to the teachings of the present invention. Notice how the cross-sectional area or current handling capacity (circular mil per amp) of the primary windings of both windings (primary and tertiary) were increased over that of the original design. The significant reduction in length of the tertiary winding versus that of the primary winding should also be noted.

TABLE 1

400 HP Siemens-Allis Three-Phase Form Coil Induction Motor Model 110 - Voltage 2300 - Frame 507 US - FLA 89 RPM 3565 - Type FODWS - ENCL ODP - S.F. 1.15

| Original Winding Schedule | |
|---|---|
| | Primary Winding |
| Slot Width | .424" |
| Slot Depth | 2.357" |
| Coil Space Under Wedge | 2.253" |
| Overall Coil Length | 24.5" |
| Slots | 48 |
| Coils | 48 |
| Span | 1-15 |
| Turns Per Coil | 6 |
| Wire Size (Rectangular) | .140" × .250" |
| Wires In Multiple | 1 |
| Circular Mil Per Path | 39208 |
| Circular Mil Per Amp | 440 |
| Groups | 6 of 8 |
| Winding Connection | 1 Wye (Star) |
| Normal Operating Current | 89 Amps |
| Winding Voltage | 2300 |
| Capacitance | None |

| New Winding Schedule | |
|---|---|
| Primary Winding | Tertiary Winding |

TABLE 1-continued

400 HP Siemens-Allis Three-Phase Form Coil Induction Motor Model 110 - Voltage 2300 - Frame 507 US - FLA 89 RPM 3565 - Type FODWS - ENCL ODP - S.F. 1.15

| | | |
|---|---|---|
| Slots | 48 | 48 |
| Coils | 48 | 48 |
| Overall Coil Length | 24.5" | 18.5" |
| Span | 1–15 | 1–15 |
| Turns Per Coil | 6 | 3 |
| Wire Size (Rectangular) | .129" × .258" | 14 AWG (Round) |
| Wires In Multiple | 1 | 4 |
| Circular Mil Per Path | 37829 | 7757 |
| Circular Mil Per Amp | 456 | 852 |
| Groups | 6 of 8 | 6 of 8 |
| Winding Connection | 1 Wye (Star) | 1 Δ |
| Normal Operating Current | 83 Amps | 36 Amps |
| Winding Voltage | 2300 | 660 |
| Capacitance | None | 3 × 145 MFD |

It should be understood by those skilled in the art that a motor of the present invention could also be connected with any other of the winding arrangements shown in co-pending U.S. patent application Ser. No. 321,233, entitled "HIGH-EFFICIENCY SINGLE AND POLYPHASE ELECTROMAGNETIC INDUCTION MACHINES," filed on Mar. 9, 1989, relating to single and polyphase motors. If these alternate arrangements or connections are used with this present invention, similar results will still occur to those noted in Table 1.

Figure 14:
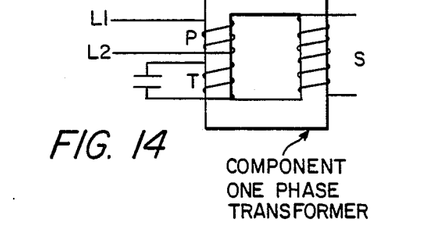
FIG. 14 is a schematic diagram of a preferred embodiment of the present invention as it would relate to a single-phase transformer or similar induction device.
Figure 15:
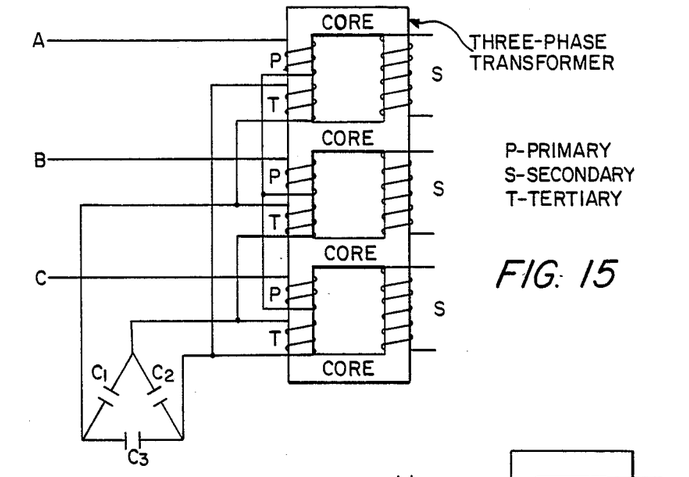
FIG. 15 is a schematic diagram of a preferred embodiment of the present invention as it would relate to a three-phase transformer or similar induction machine.

It should be noted that FIGS. 14 and 15 make reference to other induction devices that could be constructed with techniques similar to those applied to induction machines. As mentioned before, because a motor is a special form of transformer, those skilled in the art will also understand the host of other induction machines or devices that would also fall under the scope of this invention. FIGS. 14 and 15, in particular, illustrate the preferred physical relationship of a primary winding P to secondary S and tertiary T windings of a single and polyphase transformer or similar induction machines as it might relate to the present invention.

From the above, it is apparent that many modifications and variations of the present invention are possible in light of the above teachings. It is therefore to be understood that, within the scope of the appended claims, the invention may be practiced otherwise than as specifically described.

What is claimed is:

1. A polyphase induction machine adapted to be supplied with polyphase power at a plurality of input terminals, said machine comprising:

a rotatable rotor carrying a plurality of interconnected rotor windings;

a stator operatively associated with said rotor;

a plurality of primary stator windings disposed in said stator for each phase of said polyphase power and receiving, via one of said input terminals, a different phase of said polyphase power and adapted to be magnetically coupled to said rotor windings, each of said primary stator windings being in the form of an insulated form coil;

first means for electrically connecting said primary stator windings in a first configuration;

a plurality of secondary stator windings disposed in said stator such that said secondary stator windings are not electrically connected to said input terminals, are not electrically connected to said primary stator windings, and are adapted to be magnetically coupled to said primary windings and magnetically coupled to said rotor windings when said machine is operating, each of said secondary stator windings exhibiting an inductive reactance, and being in the form of a random coil;

second means for electrically connecting said secondary stator windings in a second configuration; and a capacitor exhibiting a capacitive reactance and being provided for each secondary stator winding wherein said capacitor is electrically connected across at least one of said secondary stator windings and is of such a size as to form a parallel floating resonant circuit with said at least one of said secondary stator windings where said capacitive and inductive reactances will be equal at a predetermined resonant frequency.

2. The polyphase machine of claim 1, wherein said plurality of primary stator windings is three and said first configuration is a wye configuration.

3. The polyphase machine of claim 1, wherein said plurality of secondary stator windings is three and said second configuration is a wye configuration.

4. The polyphase machine of claim 1, wherein said plurality of primary stator windings is three and said first configuration is a Δ configuration.

5. The polyphase machine of claim 1, wherein said plurality of secondary stator windings is three and said second configuration is a Δ configuration.

6. The polyphase machine of claim 1, wherein each of the capacitors provided for the secondary windings are electrically connected.

7. The polyphase machine of claim 6, wherein said capacitors are electrically connected in a Δ configuration.

8. The polyphase machine of claim 6, wherein said capacitors are electrically connected in a wye configuration.

* * * * *